United States Patent
Escudero Olano et al.

(10) Patent No.: US 10,920,670 B2
(45) Date of Patent: Feb. 16, 2021

(54) SEALING DEVICE ARRANGEMENT AT THE INTERFACE BETWEEN A COMBUSTOR AND A TURBINE OF A GAS TURBINE AND GAS TURBINE WITH SUCH A SEALING ARRANGEMENT

(71) Applicant: ANSALDO ENERGIA SWITZERLAND AG, Baden (CH)

(72) Inventors: Marcos Escudero Olano, Zurich (CH); Stephan Strueken, Zurich (CH); Thomas Zierer, Ennetbaden (CH); Frank Graf, Nussbaumen (CH); Adnan Eroglu, Untersiggenthal (CH); Joshua R. McNally, Jupiter, FL (US); Stephen W. Jorgensen, Palm City, FL (US); Afzal Pasha Mohammed, Jupiter, FL (US)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 265 days.

(21) Appl. No.: 15/727,328

(22) Filed: Oct. 6, 2017

(65) Prior Publication Data
US 2018/0100439 A1 Apr. 12, 2018

(30) Foreign Application Priority Data

Oct. 6, 2016 (EP) .................................... 16192706

(51) Int. Cl.
*F02C 7/28* (2006.01)
*F01D 11/00* (2006.01)
(Continued)

(52) U.S. Cl.
CPC ............... *F02C 7/28* (2013.01); *F01D 9/023* (2013.01); *F01D 9/041* (2013.01); *F01D 11/003* (2013.01);
(Continued)

(58) Field of Classification Search
CPC .......... F02C 7/28; F01D 9/023; F01D 11/003; F01D 11/005; F05D 2240/55; F05D 2240/80; F16J 15/022; F16J 15/06
See application file for complete search history.

(56) References Cited

U.S. PATENT DOCUMENTS

| 6,199,871 B1 * | 3/2001 | Lampes ................ F01D 11/005 277/614 |
| 6,450,762 B1 * | 9/2002 | Munshi .................... F01D 9/023 415/138 |

(Continued)

FOREIGN PATENT DOCUMENTS

| EP | 1 731 714 A1 | 12/2006 |
| EP | 2 098 688 A1 | 9/2009 |

(Continued)

OTHER PUBLICATIONS

European Search Report for EP 16192706.6 dated Mar. 9, 2017.

*Primary Examiner* — Todd E Manahan
*Assistant Examiner* — Thuyhang N Nguyen
(74) *Attorney, Agent, or Firm* — Buchanan Ingersoll & Rooney PC

(57) ABSTRACT

A sealing arrangement at an interface between a combustor and a turbine of a gas turbine. The turbine can include deflecting vanes at its inlet, which deflecting vanes are each mounted within the turbine so as to define an inner or outer diameter platform and are in sealing engagement via an inner or outer diameter vane tooth with a seal arranged at the corresponding inner or outer diameter part of the outlet of the combustor. The seal is movable and is pressed on the inner or outer diameter vane tooth by a differential pressure such that the pressure of the mainstream hot gas flow is a lower pressure.

9 Claims, 3 Drawing Sheets

(51) Int. Cl.
*F01D 9/02* (2006.01)
*F16J 15/46* (2006.01)
*F01D 9/04* (2006.01)
*F16J 15/06* (2006.01)
*F02C 3/04* (2006.01)

(52) U.S. Cl.
CPC ............. *F16J 15/06* (2013.01); *F16J 15/46* (2013.01); *F02C 3/04* (2013.01); *F05D 2220/32* (2013.01); *F05D 2240/35* (2013.01); *F05D 2240/55* (2013.01); *F05D 2250/283* (2013.01); *F16J 15/065* (2013.01)

(56) References Cited

U.S. PATENT DOCUMENTS

| | | | |
|---|---|---|---|
| 7,178,340 B2* | 2/2007 | Jorgensen | ............... F01D 9/023 415/138 |
| 8,206,093 B2* | 6/2012 | Irmisch | ................. F01D 9/023 415/173.7 |
| 2004/0031271 A1 | 2/2004 | Jorgensen | |
| 2009/0166988 A1 | 7/2009 | Irmisch | |
| 2016/0076454 A1 | 3/2016 | Reiter et al. | |
| 2016/0169020 A1 | 6/2016 | Ryan et al. | |

FOREIGN PATENT DOCUMENTS

| | | |
|---|---|---|
| EP | 2 998 517 A1 | 3/2016 |
| WO | WO 2015/050624 A2 | 4/2015 |

\* cited by examiner

SEALING DEVICE ARRANGEMENT AT THE INTERFACE BETWEEN A COMBUSTOR AND A TURBINE OF A GAS TURBINE AND GAS TURBINE WITH SUCH A SEALING ARRANGEMENT

PRIORITY CLAIM

This application claims priority from European Patent Application No. 16192706.6 filed on Oct. 6, 2016, the disclosure of which is incorporated by reference.

TECHNICAL FIELD

The present invention relates to an interface seal device arrangement to be placed between a combustor and a turbine within a gas turbine assembly.

It further refers to a gas turbine with such a sealing arrangement device.

BACKGROUND

The combustor of a gas turbine is a generally static assembly that is connected at an interface to a turbine module comprising a plurality of rotating discs and blades attached to each disc. A seal is located at a generally inner diameter between the combustor and a proximal turbine module having proximal vanes to deflect a flow of hot air towards rotating blades. In particular, the seal faces a vane platform of the proximal vanes and is designed to reduce leakages of cooling air in the mainstream flow of hot gasses and to absorb relative misalignments and thermal expansion differential between the combustor and the vane platform.

U.S. Pat. No. 7,178,340 discloses an elastic seal, preferably made from honeycomb material to seal the combustor/turbine interface of a gas turbine (see FIG. 1). Such a seal closes a sealing gap between the vane platform and the combustor, and is pressed against the vane platform due to some elastic capabilities of the honeycomb material. Such pre-load keeps the gap closed when the distance between the combustor and the vane platform changes over time and increases sealing performances. Moreover local gaps due to misalignment can be compensated by the honeycomb structure of the seal. Such a layout may not be always effective in case of a large relative displacement between the combustor and the turbine.

Another sealing device comprises a double sliding joint, having a first degree of freedom in the axial direction and a second degree of freedom in radial direction. A disadvantage of the double sliding joint is that there may be uncompensated local gaps.

A tight sealing between the combustor and the turbine is important to prevent cooling air from bypassing around the combustor, thus leading to higher flame temperature and higher NOx emissions. Furthermore, leakage of cooling air into the hot gas path causes, in general, a temperature non-uniformity at the turbine inlet. During the working life of the gas turbine, ageing and deterioration wear or plastically deform the seal device. Both lead to an increase of the leakage gap. A second problem is that sometimes the relative movement between the combustor and the turbine module is so big that it cannot be covered by the elastic properties of the material. Then the seal deforms plastically. This could lead to clamping of the seal and poor sealing quality.

SUMMARY

It is an object of the present invention to provide a sealing device arrangement at the combustor/turbine interface, which provides high sealing performances also where the relative displacement between the combustor and the interface is large.

It is a further object of the invention to provide a gas turbine with such a sealing arrangement.

These and other objects are obtained by a sealing arrangement according to claim 1 and a gas turbine according to claim 9. A sealing device according to the present invention has a translational degree of freedom and receives the force generated by a pressure differential to close the sealing gap pushing the seal towards the sealing component and to recover relative movements between the combustor and the turbine module to provide adequate sealing during all turbine operation.

This force can be achieved with pressure difference between the two parts to be sealed.

In particular, the rigidly movable seal device is housed in a cavity that is in fluid communication with a source of high pressure, e.g. cooling air generated by the high pressure compressor.

This can be achieved by machining one or more holes or slots in the surface of the component facing the relatively high pressure in order to let pressurized air pass and exert a force on the seal device, causing the latter to move towards the inner diameter vane platform. This force compensates the friction force opposing the seal movement.

In order to achieve a homogeneous pressure force a flow distribution channel can be machined in the back face of the seal so that the air fed to the cavity can be evenly distributed around the whole circumference. The groove is designed so that there is an open space between the activation fluid inlet and the back face of the seal.

Furthermore the seal device is such that it has space to axially slide in its cavity. The sliding space is dimensioned such that when the combustor is close to the vane platform, the seal is compressed within its elastic capability. In particular, the axial sliding range shall be of the amplitude of the relative movement between the two parts to be sealed minus the elastic range of the seal. When the vane moves away from the combustor, then the seal slides in the cavity and is pressed against the vane platform by pressure forces.

Furthermore the seal device shall be designed so as to have circumferential and radial clearance at cold conditions inside the cavity. Such clearance shall be equal to the maximum elongation of the seal when it is crushed during operation. This avoids a clamping or blocking of the seal, which can happen due to radial and/or axial expansion of the seal due to its compression or temperature.

BRIEF DESCRIPTION OF THE DRAWINGS

For a better understanding of the present invention, the latter will further be disclosed with reference to the accompanying figures in which.

DETAILED DESCRIPTION OF EXEMPLARY EMBODIMENTS

Figure 1:
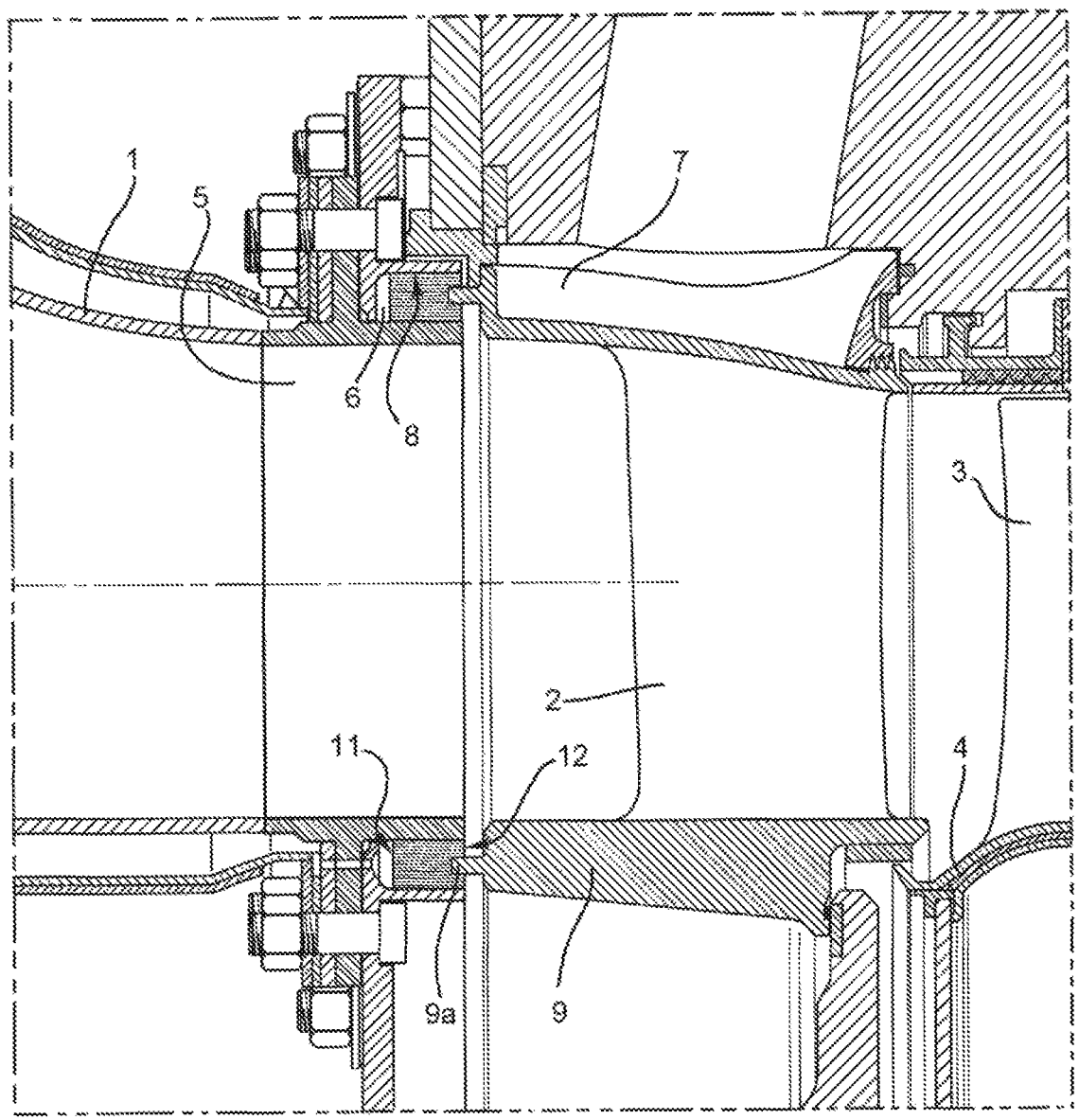
FIG. 1 shows an axial cross section of an interface area between a combustor and a turbine module.

The basic idea of the present invention is to provide a movable seal device that is pressed against a vane platform by a pressure differential to avoid or at least decreasing the crushing of the seal during use, FIG. 1 discloses a layout, within a gas turbine, wherein a duct 1 of a combustor (not shown) faces a first stage of vanes 2 of a turbine module that receives a flow of hot gases generated by the burner. For example, duct 1 is one from a plurality of transition ducts to connect a respective combustion chamber to the first stage of vanes 2. The vanes deflect the flow of hot gasses for an efficient interaction with blades 3, which are supported by a rotating disc. Duct 1 comprises an outlet 5 for hot gasses facing first stage of vanes 2. The outlet is delimited at an outer diameter by an outer annular cavity 6 facing an outer diameter vane platform 7; and at an inner diameter by an inner annular cavity 8 facing an inner diameter vane platform 9. Inner and outer cavities 6, 8 have a respective radial dimension for interaction with a relative sealing tooth extending axially from the relevant vane platform throughout the working condition of the gas turbine.

In particular, outer diameter vane platform 7 comprises an outer tooth 7a and inner diameter vane platform 9 comprises an inner tooth 9a. Both teeth 7a, 9a have a respective tip facing the respective cavity 6, 8 at least during steady state operation of the gas turbine, as shown in the figures.

Figure 2:
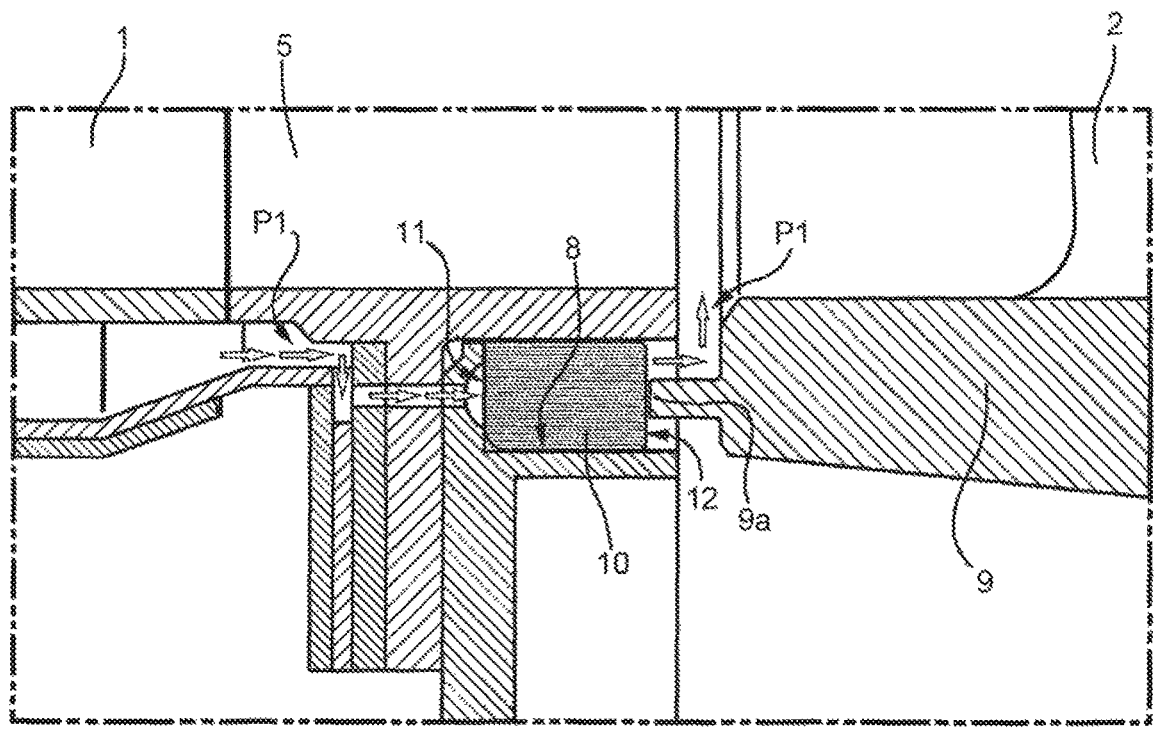
FIG. 2 shows an enlarged detail of FIG. 1 showing the position of an improved sealing device according to the present invention.

FIG. 2 shows a detail of an interface between the combustor and the inner diameter vane platform 9. Inner cavity 8 houses a movable seal 10, in particular an axially movable seal, that is kept in contact with inner tooth 9a by the action of a differential pressure established between the inner volume of cavity 8, the volume being closed by movable seal 10, and the area where a face of movable seal 10 contacts or faces inner tooth 9a. In particular, pressure of the main gas flow hitting vanes 2 has a pressure that is at a slightly lower level with respect to pressure kept in the area between the inner platform 9 and an axis of rotation of blades 3 (not shown), i.e. the axis of the gas turbine or the machine axis. This can be, for example, achieved by spilling cooling hair from the high pressure compressor and injecting such cooling flow in the area circumscribed by inner vane platform 9 and additional inner platforms of blades and vanes downstream of vane platform 9.

Movable seal 10 has a cavity facing side 11 and a vane facing side 12. Cavity facing side 11 is inside inner cavity 8 and vane facing side 11 contacts tooth 9a. Preferably, pressure differential of movable seal 10 is dimensioned such that, during contact with tooth 9a, movable seal 10 is in its elastic range. According to the embodiment of FIG. 2, cavity facing side 11 and vane facing side 12 are axially spaced apart and movable seal 10 is axially movable inside inner cavity 8. Inner cavity 8 guides movable seal 10 in extraction and retraction depending on the pressure differential applied on cavity facing side 11 and vane facing side 12. Coupling of movable seal 10 in inner cavity 8 is such to define a fluidic barrier and therefore to minimize, inside inner cavity 8, leakages of air along the axial direction from cavity facing side 11 towards vane facing side 12.

Preferably, movable seal 10 has a honeycomb structure having cells oriented parallel to cavity facing side 11 and vane facing side 12. In general, cells can be inclined with respect to sides 11, 12 but cells cannot be parallel to the direction of translation of movable seal 10 inside inner cavity 8.

In order to receive a pressure signal acting on cavity facing side 11, inner cavity 8 is fluidly connected to a high pressure source, e.g. cooling air spilled from high pressure compressor. Fluid connection is such that a relatively high pressure P1 is applied to cavity facing side 11, e.g. the pressure spilled from high pressure compressor.

Figure 3:
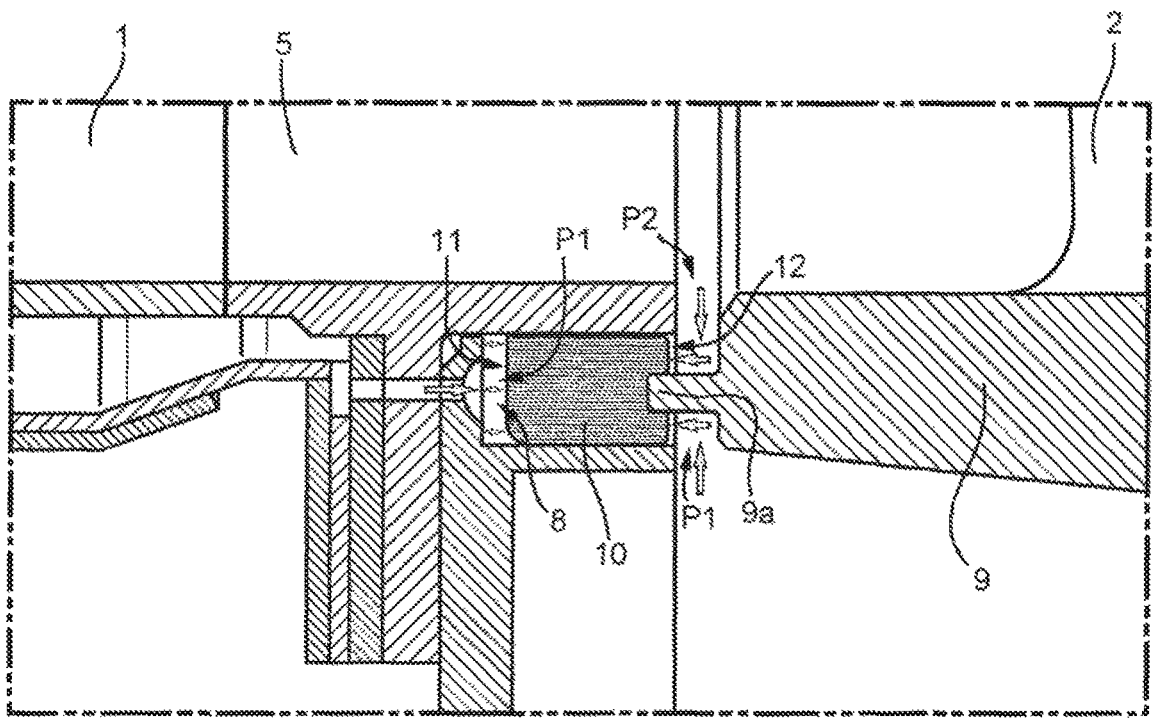
FIG. 3 is the detail of FIG. 2 showing surfaces of action for the pressure differential that actuates the sealing device according to the present invention.

FIG. 3 discloses how pressure is applied to movable seal 10 to obtain a force pressing the seal on inner tooth 9a. Higher pressure P1 is acting on cavity facing side 11 as a whole (solid and enlarged line). Pressure P1 is also applied to the portion of vane facing side 12 that is radially internal to inner tooth 9a, i.e. the portion of vane facing side 12 that is comprised between inner tooth 9a and the axis of rotation of blades 3 (solid and enlarged line). Remaining annular portion of vane facing side 12, i.e. the portion from tooth 9a towards vanes 2, is exposed to pressure P2 of the hot gas mainstream flow. As previously discussed, pressure P2 is lower than pressure P1, thus causing a balance force that constantly presses movable seal 10 against inner tooth 9s.

Example of FIG. 3 shows an embodiment where the relevant areas for pressure action of cavity facing side 11 and that of vane facing side 12 are the same. It is however possible that, depending on the pressure distribution layout in the region of the combustor-turbine interface, cavity facing side 11 has a different area than that of vane facing side 12. Indeed, annular surfaces 11, 12 have to be selected in such a way that at given pressure differences (P1–P2) a force is generated, which moves seal 10 towards vane platform 9. Cavity facing side 11 faces pressure P1 while vane facing side 12 faces both, P1 on the surface below tooth 9a and pressure P2 on the surface above tooth 9a. Surfaces of vane facing side 12 have to be selected so that at any engine conditions the sum of the pressure forces acting on the surfaces is acting towards vane platform 9.

Figure 4:
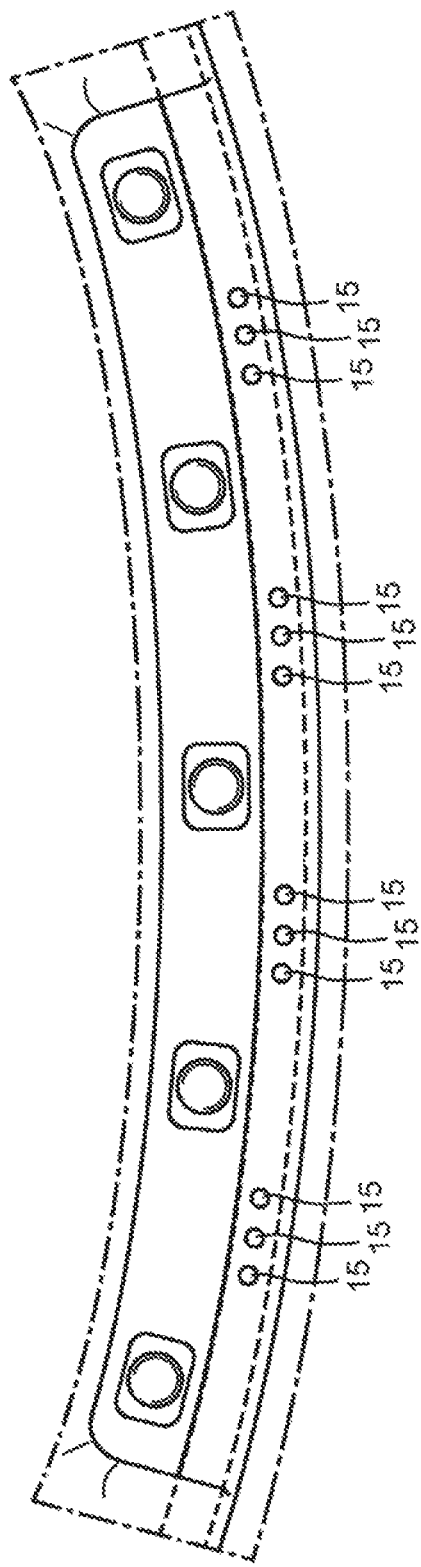
FIG. 4 is an angular section of a front view of a combustor facing side of the sealing device according to the present invention.

FIG. 4 shows a first embodiment according to which fluid communication of inner cavity 8 is embodied by a plurality of through holes 15. Through holes 15 connect inner cavity 8 to the area where pressure P1 is kept so that cavity facing side 11 is exposed to pressure P1.

Figure 5:
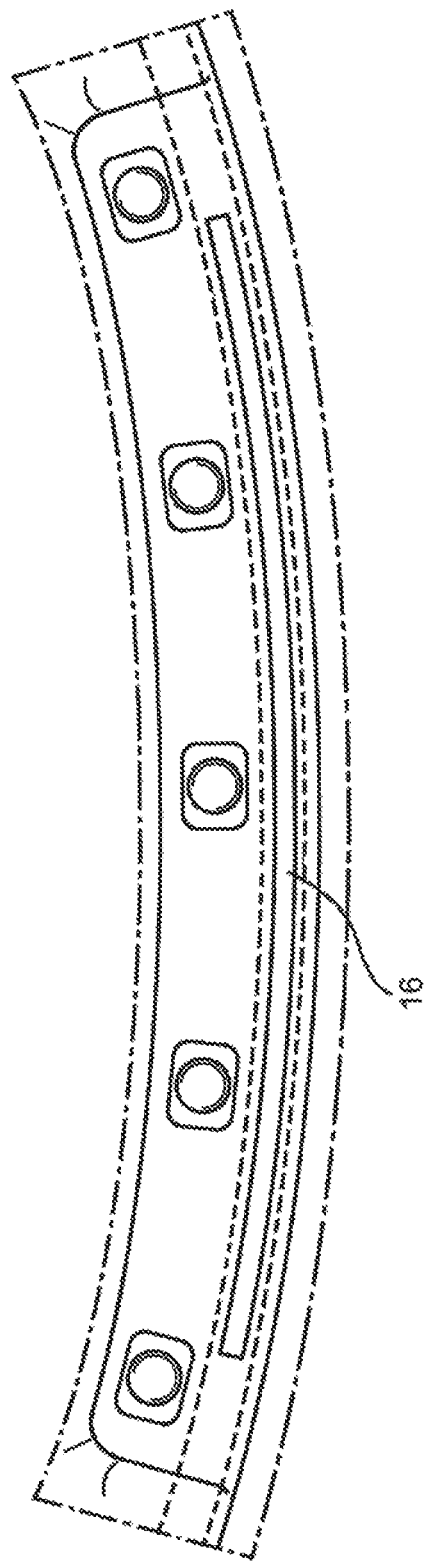
FIG. 5 is an angular section of a front view of a further embodiment of a combustor facing side of the sealing device according to the present invention.

FIG. 5 shows an alternative embodiment for application of pressure P1 to cavity facing side 11. In particular, around the circumferential direction about the axis of rotation of the blades, a plurality of circumferential slots 16 fluidically connect inner cavity 8 to the area where pressure P1 is kept.

The advantages of the sealing arrangement according to the invention are: The seal compression against vanes 2, in particular against inner tooth 9a, can be limited such that movable seal 10 works in its elastic range while still ensuring an appropriate sealing during the whole engine operation. This reduces seal damage and wear.

In general, an elastic seal, in particular a honeycomb seal, circumferentially elongates as a consequence of compression from the vanes. Therefore a circumferential clearance must he provided in the design and creates an additional leakage path. The sealing arrangement according to the present invention decreases the compression of movable seal 10 because the latter slides. Less compression due to sliding space in the groove means also that less circumferential space has to be provided, which means less secondary leakage.

The sealing effectiveness depends only on pressure differential, so it is not affected by the deterioration of seal elasticity due to higher temperature or wear.

Furthermore, the seal material can he chosen according to other criteria (e.g. resistance to high temperature, tribology) rather than elastic range.

In general, this invention provides a more robust design against wear and undesired leakage, which reduces the risk of an increase of flame temperature and emissions.

According to a not-shown embodiment, a spring element is provided in cavity 8 to support the pressure force and bias movable seal 10 towards inner diameter vane platform 9.

Furthermore, the embodiment of the figures provides that the translation of movable seal 10 is along the axis of the machine. It is however possible that cavity 8 is shaped so as to define also an inclined or a slightly inclined translation of movable seal 10 with respect to the machine axis.

According to a not-shown embodiment, the differential pressure can be generated on an outer-diameter pressure-activated seal, e.g. by canalizing air from the compressor in a known manner on an outer diameter path. In such a case, it is preferred to have an inner diameter seal contacting inner tooth 7a, The contact surface may preferably be an inclined plane with respect to the axis of the turbine and/or the inner diameter seal is a honeycomb seal. Even more preferably, the honeycomb cells are rotated to be parallel to the sealing surface. In particular, inner tooth 7a has an inclined contacting surface and a honeycomb seal has a correspondingly inclined sealing surface, which is held in a seal carrier. The seal carrier can be split to reduce clearance between seal and seal carrier. The honeycomb cells are also inclined to minimize forces to the seal which is beneficial to reduce leakage with a seal that has increased clearance, for both, design clearance and degraded material. A centreline of a cross section of the seal carrier is inclined and perpendicular to the honeycomb cells. An example of such seal carrier is described in EP2998517.

The invention claimed is:

1. A sealing arrangement for combination with an interface between a combustor and a turbine of a gas turbine, said arrangement comprising:

deflecting vanes at an inlet of the turbine, the deflecting vanes being configured for mounting within said turbine so as to define an inner or outer diameter platform, and being in sealing engagement by an inner or outer diameter vane tooth, each having a seal contacting face with a seal arranged at a corresponding inner or outer diameter part of an outlet of a combustor, the seal housed in cavity and including a cavity facing side in fluid communication with a first pressure (P1) and a vane facing side having a vane tooth contacting face, the vane facing side at least partly in fluid communication with a second pressure, the first pressure being higher than the second pressure, the seal being movable and pressed on said inner or outer diameter vane tooth by a differential pressure between the first pressure and the second pressure such that the inner or outer diameter vane tooth is at least partially embedded into the seal, a pressure of mainstream hot gas flow is the second pressure (P2), and the seal contacting face having an area that is less than an area of the vane tooth contacting face.

2. Arrangement according to claim 1, wherein the vane facing side is arranged to be exposed to said second pressure (P2) in an annular portion from the inner diameter vane tooth away from a machine axis; and the vane facing side is arranged to be exposed to said first pressure (P1) in an annular portion from the inner diameter vane tooth towards said machine axis.

3. Arrangement according to claim 1, wherein the cavity receives the first pressure (P1) via a through passage in order to load the cavity facing side.

4. Arrangement according to claim 1, wherein the cavity facing side and the vane facing side have a same annular surface.

5. Arrangement according to claim 1, wherein the seal comprises:
a honeycomb material.

6. Arrangement according to claim 1, in combination with a compressor, wherein the first pressure (P1) is spilled from a high pressure compressor of the gas turbine.

7. Arrangement according to claim 1, wherein the differential pressure presses the seal such that the seal works in its elastic deformation field.

8. Arrangement according to claim 1, wherein the vane tooth is an inner diameter vane tooth.

9. A gas turbine comprising:
a combustor;
a turbine; and
a sealing arrangement according to claim 1, the sealing arrangement being located at an interface of the combustor and the turbine.

* * * * *